United States Patent
Liu et al.

(10) Patent No.: US 11,791,662 B2
(45) Date of Patent: Oct. 17, 2023

(54) WIRELESS POWER RECEIVER CONFIGURABLE FOR LDO OR BUCK OPERATION

(71) Applicant: Integrated Device Technology, Inc., San Jose, CA (US)

(72) Inventors: Rui Liu, Fremont, CA (US); Jiangjian Huang, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 17/935,876

(22) Filed: Sep. 27, 2022

(65) Prior Publication Data
US 2023/0044377 A1    Feb. 9, 2023

Related U.S. Application Data

(62) Division of application No. 16/437,484, filed on Jun. 11, 2019, now Pat. No. 11,482,889.

(60) Provisional application No. 62/790,418, filed on Jan. 9, 2019.

(51) Int. Cl.
H02J 50/23    (2016.01)
H02M 3/158    (2006.01)

(52) U.S. Cl.
CPC ........... H02J 50/23 (2016.02); H02M 3/1582 (2013.01)

(58) Field of Classification Search
CPC .............................. H02J 50/23; H02M 3/1582
USPC ......................................................... 320/108
See application file for complete search history.

(56) References Cited

U.S. PATENT DOCUMENTS

| | | | |
|---|---|---|---|
| 9,423,808 B2* | 8/2016 | Tateishi | G05F 1/46 |
| 10,855,183 B1* | 12/2020 | Barrenscheen | H02M 3/33592 |
| 2009/0322291 A1* | 12/2009 | Ngo | H02M 3/1584 |
| | | | 323/272 |
| 2013/0200928 A1* | 8/2013 | Knoedgen | H03K 17/163 |
| | | | 327/109 |
| 2015/0162830 A1* | 6/2015 | Dong | H02M 1/36 |
| | | | 323/271 |

FOREIGN PATENT DOCUMENTS

| | | | | |
|---|---|---|---|---|
| EP | 2717472 A1 * | 4/2014 | | G01R 19/00 |
| KR | 20090063135 A * | 6/2009 | | |

* cited by examiner

*Primary Examiner* — Suresh Memula
(74) *Attorney, Agent, or Firm* — HAYNES AND BOONE, LLP

(57) ABSTRACT

A wireless power receiver according to some embodiments includes an integrated circuit which includes: a full-bridge rectifier coupled to receive wireless power from a receiver coil; a wireless receiver controller coupled to control the full-bridge rectifier; a pass device coupled between the full-bridge rectifier and an output; and a configurable controller coupled to the switch, the configurable controller configurable as a LDO controller or a Buck controller. A second controller can be coupled to the configurable controller that interfaces to an external Buck low-side transistor if the configurable controller is the Buck controller and provides GPIO if the configurable controller is the LDO controller. A third controller can be coupled to the full-bridge rectifier, which operates as a full-bridge sync rectifier driver multiplexer to select an external driver for one or more of the rectifier transistors. Other features are also provided.

6 Claims, 5 Drawing Sheets

WIRELESS POWER RECEIVER CONFIGURABLE FOR LDO OR BUCK OPERATION

CROSS-REFERENCE TO RELATED APPLICATIONS

This application is a Divisional of U.S. patent application Ser. No. 16/437,484 filed Jun. 11, 2019, which claims priority to U.S. provisional patent application No. 62/790, 418, filed Jan. 9, 2019, which is incorporated herein by reference in its entirety as part of the present disclosure.

TECHNICAL FIELD

Embodiments of the present invention are related wireless transmission of power and, in particular, to a wireless power receiver.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The more common standards for wireless transmission of power include the Alliance for Wireless Power (A4 WP) standard and the Wireless Power Consortium standard, the Qi Standard. Under the Wireless Power Consortium, the Qi specification, a magnetic induction coupling system is utilized to charge a single device that is coupled through the receiver coil circuit. In the Qi standard, the receiving device coil is placed in close proximity with the transmission coil while in the A4 WP standard, the receiving device coil is placed near the transmitting coil, potentially along with other receiving coils that belong to other charging devices.

Typically, a wireless power system includes a transmitter coil that is driven to produce a time-varying magnetic field and a receiver coil, which can be part of a device such as a cell phone, PDA, computer, or other device, that is positioned relative to the transmitter coil to receive the power transmitted in the time-varying magnetic field.

Therefore, there is a need to develop better wireless power receivers.

SUMMARY

According to some embodiments, a wireless power receiver is provided. The wireless power receiver includes a full-bridge rectifier coupled to receive wireless power from a receiver coil; a wireless receiver controller coupled to control the full-bridge rectifier; a controllable pass device coupled between the full-bridge rectifier and an output; and a configurable controller coupled to the pass device, the configurable controller configurable as a low drop-out (LDO) controller or a Buck controller. The receiver can further include a second controller coupled to the configurable controller that interfaces to a Buck low-side transistor if the configurable controller is the Buck controller and provides GPIO if the configurable controller is the LDO controller. The receiver can further include a third controller coupled to the full-bridge rectifier, which operates as a full-bridge sync rectifier driver multiplexer if the configurable controller is the Buck controller and operates as a GPIO if the configurable controller is a LDO controller.

These and other embodiments are discussed below with respect to the following figures.

These figures are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
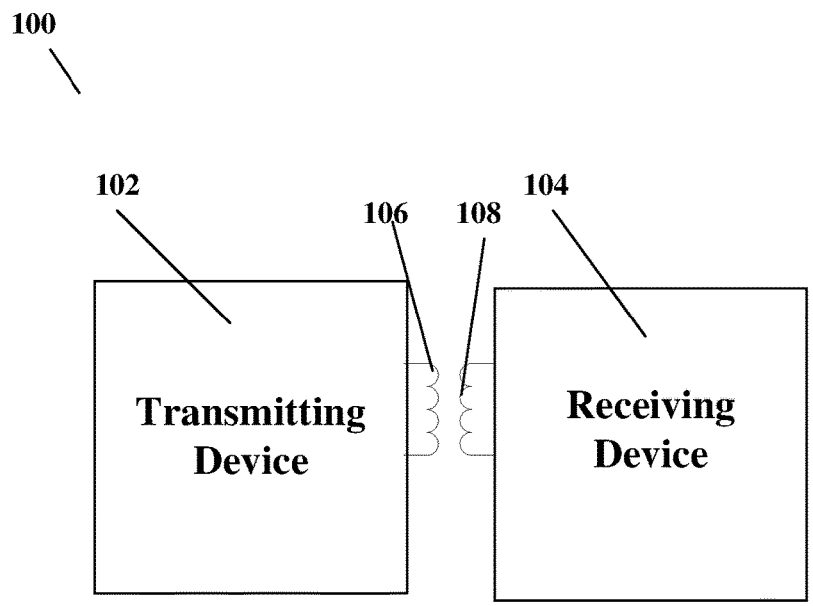
FIG. 1 illustrates a wireless power transmission system.

FIG. 1 illustrates an example wireless power transmission system 100. As illustrated in FIG. 1, a transmitting device 102 is coupled to drive a transmission coil 106 to produce a time varying magnetic field. The time varying magnetic field induces a current in receive coil 108. Receive coil 108 is coupled to receiving device 104, which receives the transmitted wireless power.

Figure 2:
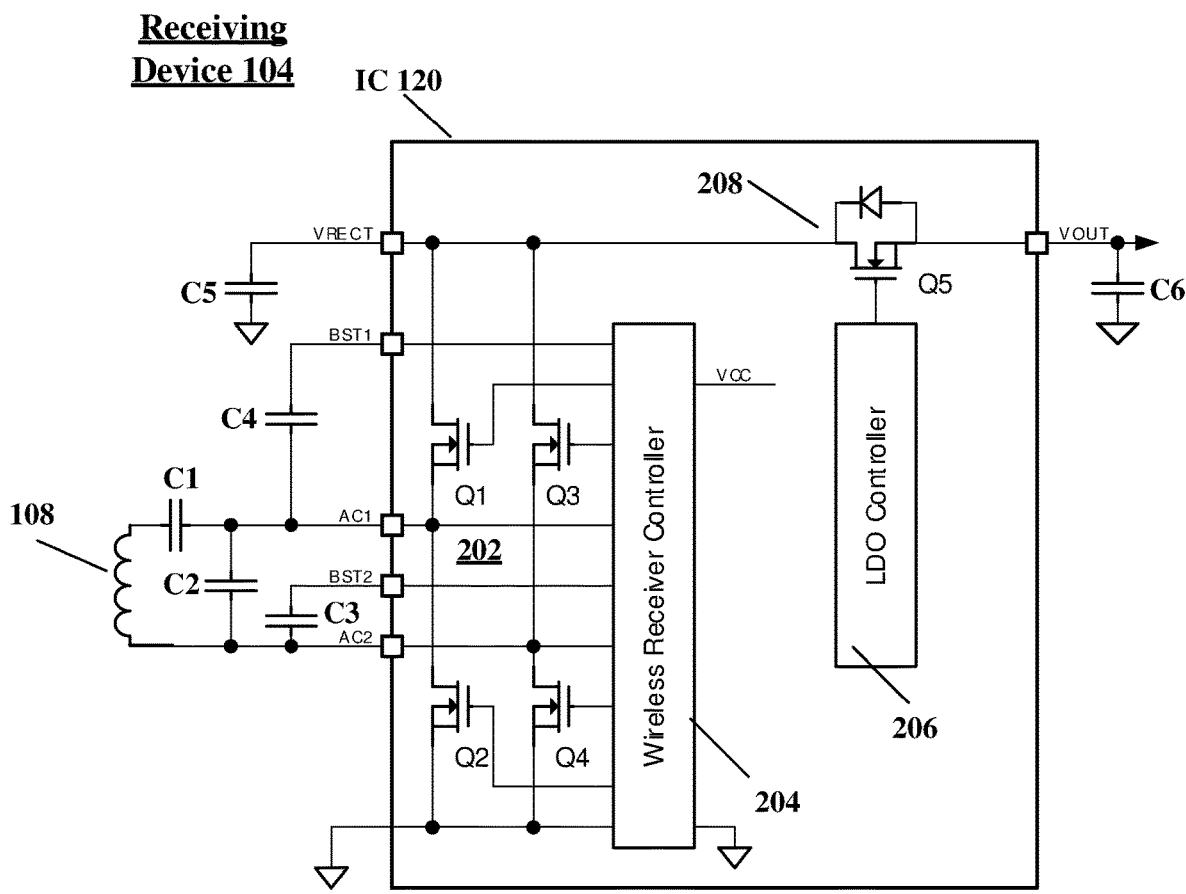
FIG. 2 illustrates a wireless power receiver.

FIG. 2 illustrates a wireless power receiver 104 including an IC (integrated circuit) 120. Receive coil 108 and capacitors C1 through C6 are external devices (not part of IC 120). In IC 120, a full-bridge synch rectifier (202) is followed by a low drop-out (LDO) circuit. Full-bridge rectifier 202 is formed by transistors Q1, Q2, Q3, and Q4, each controlled by a wireless receiver controller 204. The rectified voltage VRECT generated by rectifier 202 is coupled to the receiver's output terminal VOUT through a pass device 208 (including a transistor). Pass device 208 is controlled by a LDO controller 206. Advantageously, the receiver of FIG. 2 provides a simple architecture that can meet a wide range of requirements, and can power a system that does not have a battery. However, the LDO is inefficient when the LDO input voltage VRECT is much higher than the output voltage VOUT. When VRECT is close to VOUT, the LDO is efficient but the output current must be held low to minimize the Rx coil current and thus the LDO output power is low. Therefore, the LDO architecture is not attractive for systems requiring high output current or power, e.g. having a battery that should be charged by a high current or power.

Figure 3:
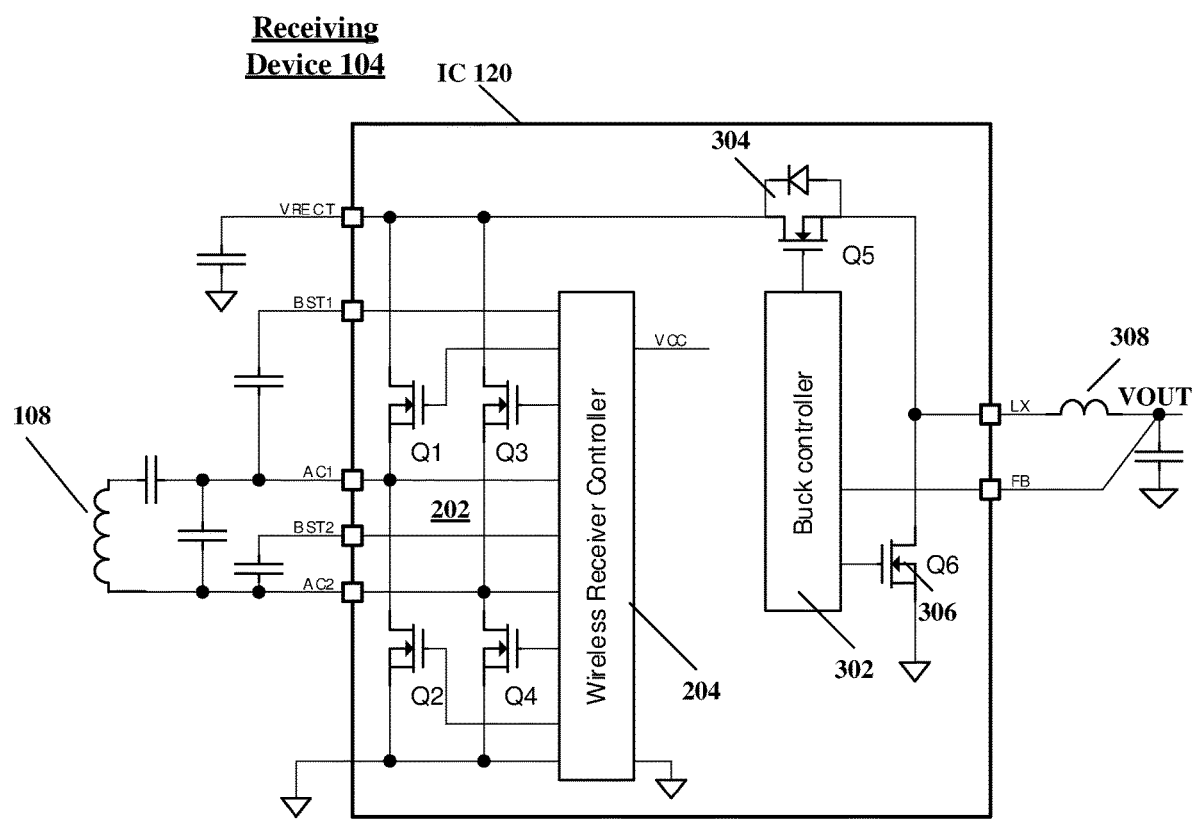
FIG. 3 illustrates another wireless power receiver.

FIG. 3 illustrates a wireless power receiver 104 with a different IC 120, for Buck converter operation. IC 120 includes Buck converter switches 304 and 306, and a Buck controller 302 controlling the switches. An external Buck inductor 308 is coupled to the IC's pin LX between switches 304 and 306. Such architecture overcomes some of the LDO disadvantages of FIG. 2. In particular, the architecture of FIG. 3 can provide high output current and power, and is suitable for charging a battery of a battery powered system. However, the power dissipation inside receiver 104 is high, raising thermal concerns. In addition, this receiver is not cost effective for non-battery powered systems.

A wireless power receiver configurable for both LDO and Buck operation has been proposed in U.S. Pre-Grant Patent Publication No. 2015/0364928 A1, published Dec. 17, 2015 (inventors: Yen et al.), incorporated herein by reference.

Some embodiments of the present invention include configurable LDO/Buck receivers using a novel IC architecture optimized for low receiver cost and low power dissipation within the IC.

Figure 4:
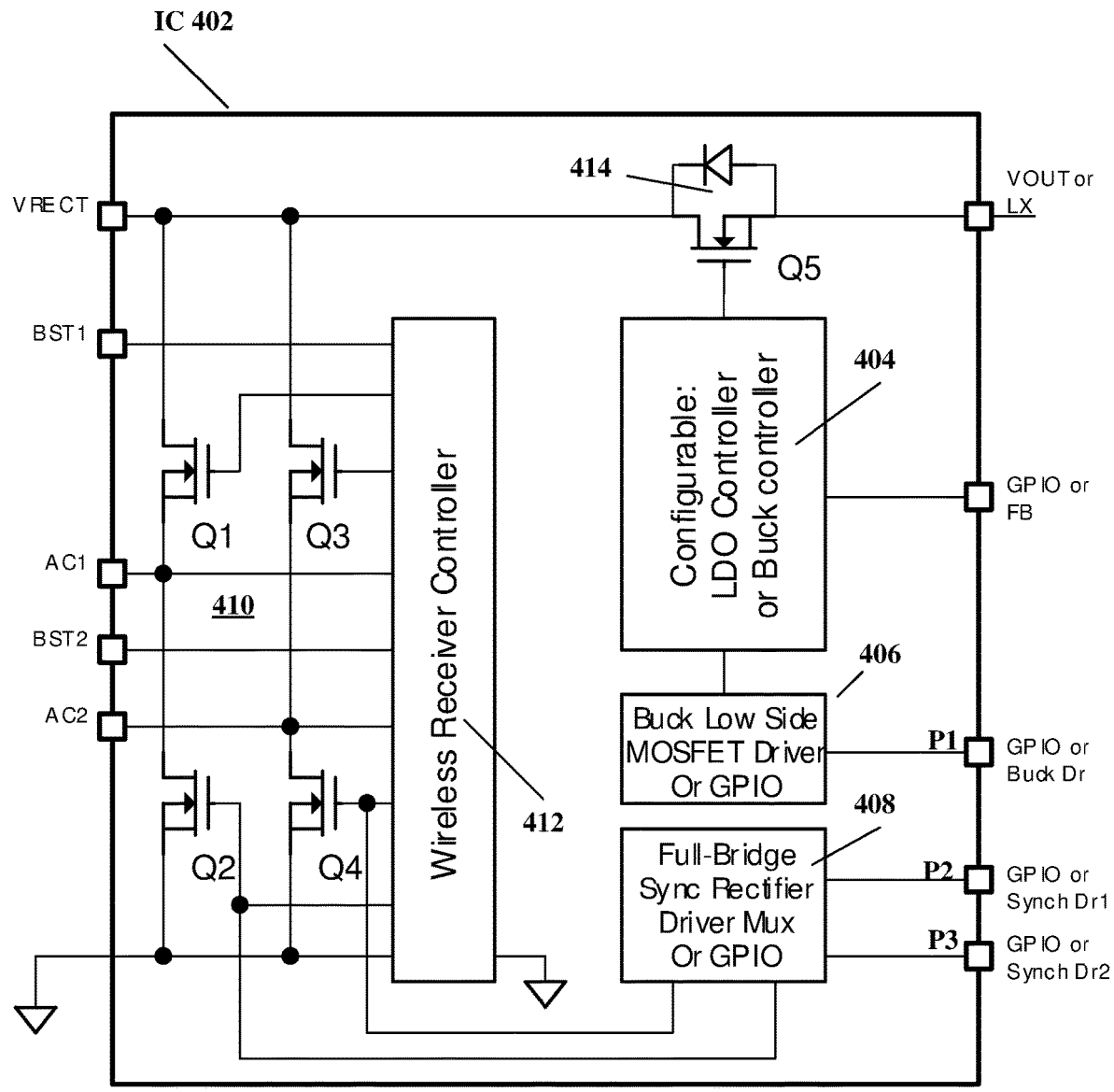
FIG. 4 illustrates a configurable integrated circuit for a wireless power receiver.
Figure 5:
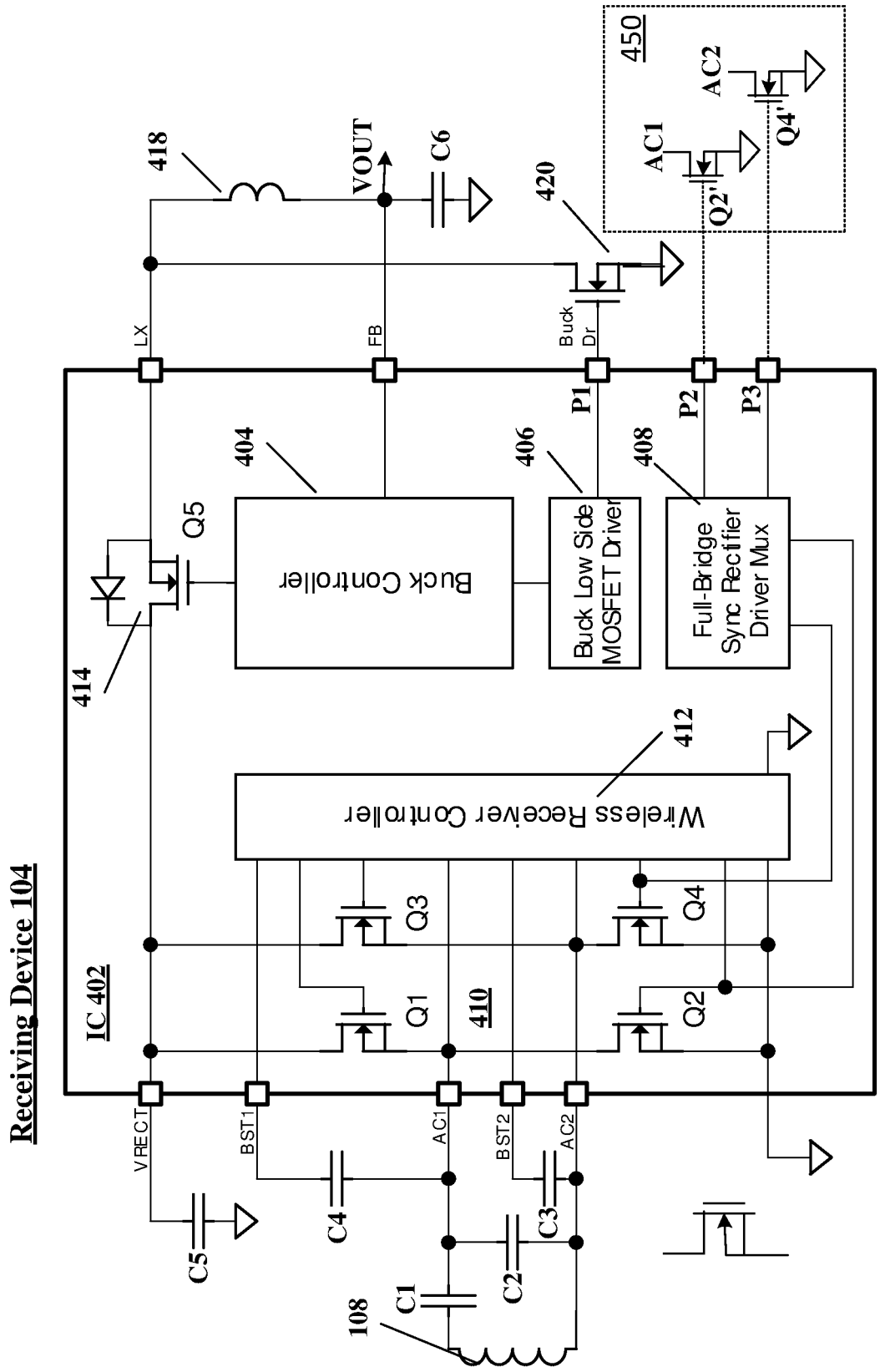
FIG. 5 illustrates wireless power receiver configured to perform Buck conversion.
Figure 6:
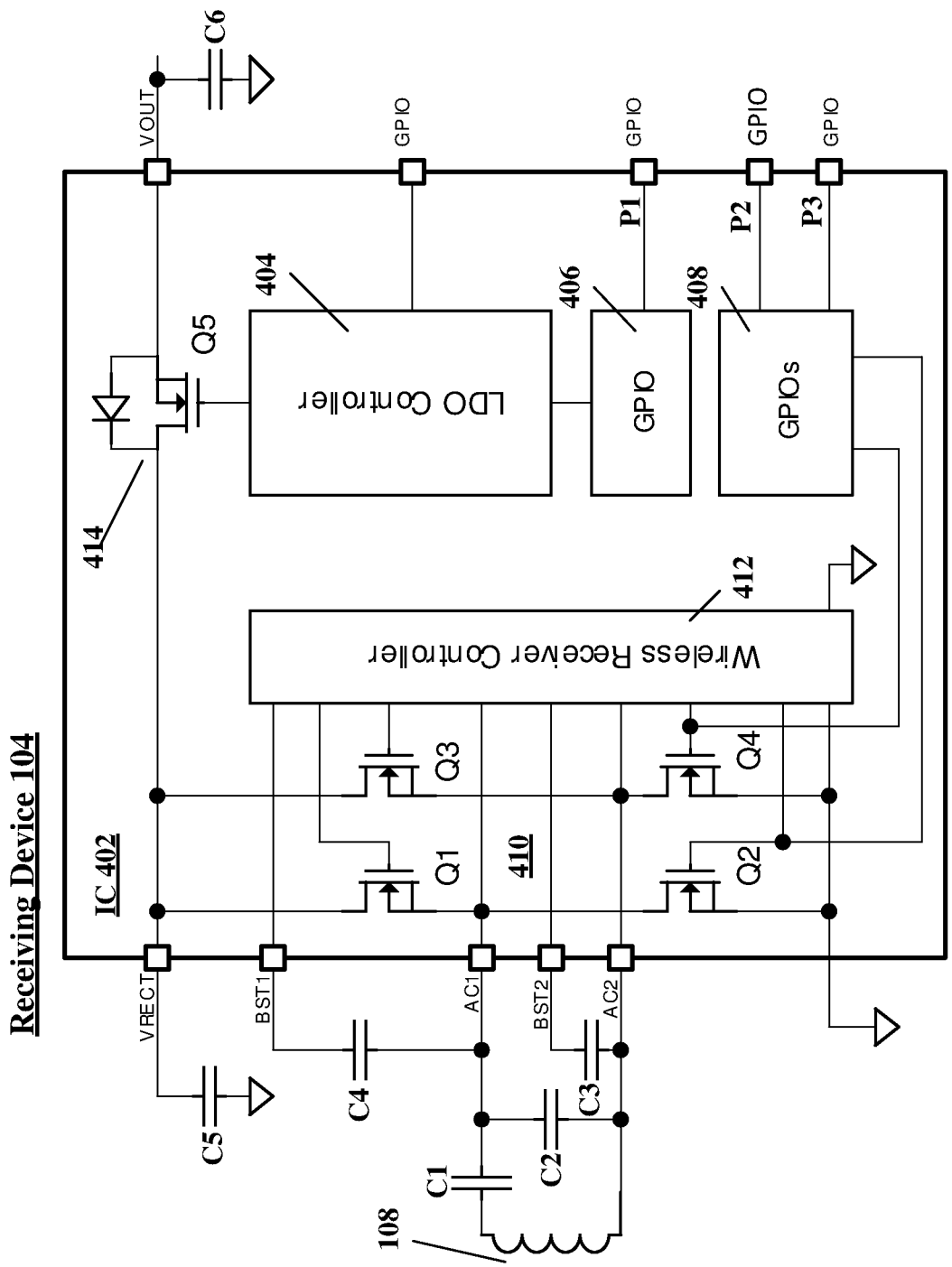
FIG. 6 illustrates the wireless power receiver configured to perform LDO conversion.

FIG. 4 illustrates one such IC 402 according to some embodiments of the present invention. FIG. 5 illustrates the IC 402 configured for Buck operation. FIG. 6 illustrates the same IC configured for LDO operation. The IC configuration can be defined by a programmable memory (not shown) in IC 402, e.g. multi time programmable memory (MTP) or some other memory type.

In IC 402, a full-bridge rectifier 410 receives power from an external receive coil 108 (FIGS. 5, 6) coupled between pins AC1 and AC2, similarly to FIG. 2 or 3. (The term "pin" is used herein for any input, output, or input/output terminal of the IC.) External capacitor network C1 through C6 can also be as in FIG. 2 or 3. Within the IC, full-bridge rectifier 410, which includes transistors Q1, Q2, Q3, and Q4, is controlled by the IC's wireless receiver controller 412 to provide a voltage VRECT to a pass device 414 (transistor Q5). This can also be as in FIG. 2 or 3.

In LDO configuration, pass device 414 functions as device 208 of FIG. 2. In Buck configuration, pass device 414 functions as a high-side Buck switch (304 in FIG. 3). Pass device 414 is controlled by a configurable controller 404, which can be configured as either an LDO controller or a Buck controller.

Configurable controller 404 is coupled to block 406, which is coupled to a pin P1. In Buck configuration, block 406 can be configured as a Buck low-side driver, to control an external Buck low-side switch 420 (FIG. 5). Switch 420 connects the pin LX (the output of pass device 414) to ground, and has a gate coupled to block 406 through pin P1. Switch 420 may have the same functionality as the internal (within the IC) switch 306 of FIG. 3.

In the LDO configuration (FIG. 6), block 406 can implement some other logic; pin P1 can be used as a GPIO (General Purpose Input/Output) pin.

Block 408 can be configured as a multiplexer to select an external, low-side sync rectifier driver (not shown) coupled to block 408 through pins P2 and P3. In this configuration, transistors Q2 and Q4 are driven by the external driver instead of wireless internal receiver controller 412. This configuration reduces power consumption in controller 412 and hence in the IC.

Alternatively, transistors Q2 and Q4 can be disabled (kept always off by controller 412), and replaced by external transistors Q2', Q4' in a block 450, to further reduce power consumption in the IC. The external transistors Q2', Q4' can be coupled between respective pin AC1 or AC2 and ground, in parallel with respective transistors Q2 and Q4. The transistors Q2', Q4' can be controlled by the external driver (not shown, possibly part of block 450), or by controller 412 coupled to the transistors Q2', Q4' through pins P2, P3 by multiplexer 408. In the latter case, multiplexer 408 can decouple the transistors Q2 and Q4 from controller 412.

Alternatively (FIG. 6), block 408 can be configured for some other type of functionality, with pins P2 and/or P3 being unused or used as GPIO pins. In this configuration, transistors Q2 and Q4 are driven by controller 412.

In some embodiments, multiplexer 408 and controller 412 are configurable independently of controller 404, so the external rectifier transistors Q2' and Q4' and/or external rectifier driver (not shown) can be used in any of the LDO or Buck configurations.

The IC architecture illustrated in FIG. 4 is cost-effective and suitable for many applications. The cost is low in LDO configuration because the Buck low-side switch 420 can be omitted. Furthermore, this structure allows effective thermal management of the IC even in high-power applications because control of rectifier MOSFETs Q2 and Q4 can be moved to external driver 450, and/or transistors Q2 and Q4 can be replaced by external transistors Q2' and Q4'. Some embodiments allow any subset of the on-chip rectifier transistors Q1-Q4, including the entire set, to be driven by an external driver, and/or be disabled and replaced by external transistors.

Further, the IC power dissipation is reduced in Buck configuration by allowing the low-side Buck switch 420 to be external. For example, by adjusting the VRECT voltage such that the Buck converter operates at less than 50% duty cycle, for example 30% to 40%, most power dissipation of the Buck converter occurs outside the IC 402, in external switch 420. Therefore, the IC power dissipation is significantly reduced.

This structure provides for wide range of applications, as the Buck converter can be configured as either voltage or current source.

Other features of receivers 104 may be as in FIG. 2 or 3. In particular, in FIGS. 5 and 6, receive coil 108 and capacitors C1 through C5 are coupled to pins AC1, AC2, BST1 (bootstrap 1), BST2 (bootstrap 2), as in FIG. 2 or 3. In FIG. 5, external Buck inductor 418 is coupled between the LX pin and the output terminal VOUT. Terminal VOUT is coupled to the FB (feedback) pin, which is coupled to the feedback input of block 404 configured as a Buck controller. VOUT is also coupled to capacitor C6 which is coupled to ground. The Buck converter is formed by switches 414 and 420, inductor 418, Buck controller 404, and block 406 configured as a Buck low side MOSFET driver to drive the switch 420.

Switch 414 can be turned off when the Buck converter needs to be disconnected from the VRECT terminal.

FIG. 6 illustrates a receiving device 104 with an Rx IC 402 configured for LDO operation, which can be useful for example for powering of systems that do not have a battery to be charged. Block 404 is configured as an LDO controller, including a differential amplifier (not shown) that compares a feedback voltage (generated from the output of pass device 414) with a reference voltage to control conductance of pass device 414 for VOUT regulation. Blocks 406 and 408 can be configured for any type of logic operation.

Consequently, some embodiments of the present invention include a Rx IC system that can be configured as either a generic Rx IC for LDO functionality, or an Rx IC for Buck converter functionality.

The above detailed description is provided to illustrate specific embodiments of the present invention and is not intended to be limiting. Some embodiments are defined by the following clauses.

Clause 1 defines an apparatus comprising an integrated circuit configurable for either a low dropout (LDO) converter operation or a Buck converter operation, the integrated circuit comprising:

a pass device (e.g. 414);

a configurable controller (e.g. 404, or 404 in combination with 406 and/or 408) coupled to the pass device, for controlling the pass device, the configurable controller being configurable to control the pass device either as a pass device of an LDO converter or as a high-side switch of a Buck converter; and a first pin (e.g. P1; the term "pin" is used broadly; this could be a land, or a surface mount, or any other type);

wherein the configurable controller is coupled to the first pin and is operable, in Buck converter configuration, to control an external switch (e.g. 420) coupled to the first pin to act as a Buck converter low-side switch.

2. The apparatus of clause 1 wherein the configurable controller comprises:

a first configurable controller (e.g. 404) for controlling the pass device; and a second configurable controller (e.g. 406) coupled to the first pin, for controlling the Buck converter low-side switch in the Buck converter configuration.

3. The apparatus of clause 2 wherein when configured for the LDO operation, the first pin is a general purpose IO (GPIO) pin, and the second configurable controller is operable to perform a logic function distinct from Buck converter operation.

4. The apparatus of clause 1, wherein the integrated circuit further comprises a pin (e.g. LC) coupled to the pass device, for coupling the pass device to a Buck inductor in Buck configuration.

5. The apparatus of any preceding clause, wherein the integrated circuit further comprises:

a synchronous rectifier circuit comprising:

first rectifier transistors; and a rectifier controller for controlling the first rectifier transistors;

wherein the integrated circuit further comprises one or more second pins (e.g. P2 and P3) for coupling to one or more external rectifier transistors (e.g. Q2' and Q4') for replacing one or more first rectifier transistors (e.g. Q2 and Q4) in operation of the integrated circuit.

6. The apparatus of clause 5, wherein the integrated circuit further comprises a multiplexer circuit (e.g. 408) configurable to couple the one or more second pins to the rectifier controller for controlling the one or more external rectifier transistors instead of the one or more first rectifier transistors, the multiplexer circuit being also configurable to decouple the one or more second pins from the rectifier controller.

7. The apparatus of clause 6 wherein in a configuration in which the one or more second pins are decoupled from the rectifier controller, the one or more second pins are configurable as GPIO pins.

8. The apparatus of any one of clauses 5 through 7, wherein the rectifier controller is configured to drive all of the rectifier transistors when the integrated circuit is configured for LDO operation.

9. The apparatus of any one of clauses 5 through 8, wherein the rectifier circuit is connectable to an external receive coil to rectify an AC signal received by the coil in a wireless power receiver comprising the integrated circuit.

10. The apparatus of any one of clauses 5 through 9, wherein the rectifier circuit is a full-bridge rectifier circuit.

11. An apparatus comprising an integrated circuit comprising:

a synchronous rectifier circuit comprising:

rectifier transistors; and a rectifier controller for controlling the rectifier transistors;

wherein the integrated circuit further comprises one or more pins for coupling to an external driver for driving one or more, but less than all, of the rectifier transistors instead of the rectifier controller; and wherein the rectifier controller is configurable not to drive the one or more of the rectifier transistors to allow the one or more rectifier transistors to be driven by the external driver.

12. The apparatus of clause 11, wherein the rectifier circuit is connectable to an external receive coil to rectify an AC signal received by the coil in a wireless power receiver comprising the integrated circuit.

13. The apparatus of clause 12 wherein the receive coil is not part of the apparatus, but the integrated circuit comprises one or more pins for coupling to the receive coil.

14. The apparatus of any one of clauses 11 through 13, wherein the rectifier circuit is a full-bridge rectifier circuit.

15. A method for making a wireless power receiver, the method comprising:

(1) obtaining an integrated circuit configurable for either a low dropout (LDO) converter operation or a Buck converter operation, the integrated circuit comprising:

a pass device;

a configurable controller coupled to the pass device, for controlling the pass device, the configurable controller being configurable to control the pass device either as a pass device of an LDO converter or as a high-side switch of a Buck converter; and a first pin;

(2) determining whether the wireless power receiver is to be configured for LDO operation or Buck operation;

(3) if the wireless power receiver is to be configured for LDO operation, then configuring the configurable controller as an LDO controller;

(4) if the wireless power receiver is to be configured for Buck operation, then:

configuring the configurable controller to control the pass device as a high-side Buck switch, and to control an external low-side Buck switch; and coupling the integrated circuit to the external low-side Buck switch.

16. The method of clause 15, wherein the integrated circuit further comprises:

a synchronous rectifier circuit comprising:

rectifier transistors; and a configurable rectifier controller for controlling either all the rectifier transistors or at least one but less than all of the rectifier transistors;

wherein the method further comprises configuring the rectifier controller to control all of the rectifier transistors.

17. The method of clause 15 or 16, wherein the integrated circuit further comprises:

a synchronous rectifier circuit comprising:

first rectifier transistors; and a configurable rectifier controller for controlling either all of the first rectifier transistors, or one or more but less than all of the rectifier transistors;

wherein the method further comprises:
coupling the integrated circuit to one or more external rectifier transistors for driving the one or more external rectifier transistors instead of the one or more first rectifier transistors; and
disabling the one or more first rectifier transistors.

18. The method of claim 15, 16, or 17, wherein the integrated circuit further comprises a multiplexer circuit configurable to couple the rectifier controller to either (i) one or more pins of the integrated circuit, the one or more pins being operable to be coupled to the one or more external rectifier transistors, or to (ii) the one or more first rectifier transistors.

19. The method of claim 18, further comprising configuring the multiplexer circuit to couple the integrated circuit to the one or more pins, and coupling the one or more pins to the one or more external rectifier transistors.

20. The method of any one of clauses 15 through 19, wherein the rectifier circuit is a full-bridge rectifier circuit.

Numerous variations and modifications within the scope of the present invention are possible. The present invention is set forth in the following claims.

What is claimed is:

1. A method for making a wireless power receiver, the method comprising:
   (1) obtaining an integrated circuit configurable for either a low dropout (LDO) converter operation or a Buck converter operation, the integrated circuit comprising:
   a pass device; and
   a configurable controller coupled to the pass device, for controlling the pass device, the configurable controller being configurable to control the pass device either as a pass device of an LDO converter or as a high-side switch of a Buck converter;
   (2) determining whether the wireless power receiver is to be configured for LDO operation or Buck operation;
   (3) if the wireless power receiver is to be configured for LDO operation, then configuring the configurable controller as an LDO controller;
   (4) if the wireless power receiver is to be configured for Buck operation, then:
   configuring the configurable controller to control the pass device as a high-side Buck switch, and to control an external low-side Buck switch; and
   coupling the integrated circuit to the external low-side Buck switch.

2. The method of claim 1, wherein the integrated circuit further comprises:
   a synchronous rectifier circuit comprising:
      rectifier transistors; and
      a configurable rectifier controller for controlling either all the rectifier transistors or at least one but less than all of the rectifier transistors;
   wherein the method further comprises configuring the rectifier controller to control all of the rectifier transistors.

3. The method of claim 1, wherein the integrated circuit further comprises:
   a synchronous rectifier circuit comprising:
      first rectifier transistors; and
      a configurable rectifier controller for controlling either all of the first rectifier transistors, or one or more but less than all of the rectifier transistors;
   wherein the method further comprises:
   coupling the integrated circuit to one or more external rectifier transistors for driving the one or more external rectifier transistors instead of the one or more first rectifier transistors; and
   disabling the one or more first rectifier transistors.

4. The method of claim 1, wherein the integrated circuit further comprises a multiplexer circuit configurable to couple the rectifier controller to either (i) one or more pins of the integrated circuit, the one or more pins being operable to be coupled to the one or more external rectifier transistors, or to (ii) the one or more first rectifier transistors.

5. The method of claim 4, further comprising configuring the multiplexer circuit to couple the integrated circuit to the one or more pins, and coupling the one or more pins to the one or more external rectifier transistors.

6. The method of claim 1, wherein the rectifier circuit is a full-bridge rectifier circuit.

* * * * *